US010819708B2

United States Patent
Guo et al.

(10) Patent No.: US 10,819,708 B2
(45) Date of Patent: Oct. 27, 2020

(54) METHOD FOR AUTHENTICATING OPTICAL NETWORK UNIT, OPTICAL LINE TERMINAL, AND OPTICAL NETWORK UNIT

(71) Applicant: Huawei Technologies Co., Ltd., Shenzhen (CN)

(72) Inventors: Zengjiang Guo, Shenzhen (CN); Gang Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 270 days.

(21) Appl. No.: 15/824,441

(22) Filed: Nov. 28, 2017

(65) Prior Publication Data

US 2018/0083964 A1    Mar. 22, 2018

Related U.S. Application Data

(63) Continuation of application No. PCT/CN2015/080293, filed on May 29, 2015.

(51) Int. Cl.
*H04L 29/06* (2006.01)
*H04L 12/24* (2006.01)
(Continued)

(52) U.S. Cl.
CPC ......... *H04L 63/0876* (2013.01); *H04B 10/27* (2013.01); *H04L 41/00* (2013.01);
(Continued)

(58) Field of Classification Search
None
See application file for complete search history.

(56) References Cited

U.S. PATENT DOCUMENTS

2004/0179521 A1* 9/2004 Kim ................. H04L 63/08
370/384
2008/0310835 A1* 12/2008 Lorentzen .......... H04B 10/0773
398/9
(Continued)

FOREIGN PATENT DOCUMENTS

CN          1968089 A     5/2007
CN        101119158 A     2/2008
(Continued)

OTHER PUBLICATIONS

Machine Translation and Abstract of Chinese Publication No. CN103731764, Apr. 16, 2014, 9 pages.
(Continued)

*Primary Examiner* — Joseph P Hirl
*Assistant Examiner* — Hassan Saadoun
(74) *Attorney, Agent, or Firm* — Conley Rose, P.C.

(57) ABSTRACT

A method for authenticating an optical network unit (ONU) and devices for an optical line terminal (OLT) and an optical network unit (ONU) where an ONU is not allowed to be migrated in an authorized manner to an OLT of another vendor for use and binds the ONU and a particular vendor. The method also includes, when an ONU goes online, obtaining, by the OLT, first vendor information of the ONU, where the first vendor information is vendor information of a vendor to which the ONU belongs; comparing, by the OLT, the first vendor information with second vendor information, where the second vendor information is vendor information of a vendor to which the OLT belongs; and if a comparison result indicates that the OLT and the ONU belong to different vendors, determining, by the OLT, that authentication on the ONU fails.

17 Claims, 6 Drawing Sheets

(51) Int. Cl.
    *G06Q 30/06* (2012.01)
    *H04B 10/27* (2013.01)
    *H04B 10/50* (2013.01)
    *H04B 10/66* (2013.01)
(52) U.S. Cl.
    CPC ......... *G06Q 30/0601* (2013.01); *H04B 10/50* (2013.01); *H04B 10/66* (2013.01)

(56) References Cited

U.S. PATENT DOCUMENTS

| | | |
|---|---|---|
| 2009/0049532 A1 | 2/2009 | Gao et al. |
| 2011/0214160 A1 | 9/2011 | Costa et al. |
| 2012/0072973 A1 | 3/2012 | Gao et al. |
| 2015/0288446 A1 | 10/2015 | Yin et al. |

FOREIGN PATENT DOCUMENTS

| | | |
|---|---|---|
| CN | 101902662 A | 12/2010 |
| CN | 102170421 A | 8/2011 |
| CN | 102511134 A | 6/2012 |
| CN | 103731764 A | 4/2014 |
| CN | 103905236 A | 7/2014 |
| CN | 104469561 A | 3/2015 |
| DE | 102012024880 A1 | 6/2014 |
| EP | 1458164 A2 | 9/2004 |
| EP | 2426866 A1 | 3/2012 |
| WO | 2010109871 A1 | 9/2010 |

OTHER PUBLICATIONS

Machine Translation and Abstract of International Publication No. WO2010109871, Sep. 30, 2010, 27 pages.
Foreign Communication From a Counterpart Application, Chinese Application No. 201580000437.8, Chinese Office Action dated Jan. 22, 2019, 8 pages.
Machine Translation and Abstract of German Publication No. DE102012024880, Jun. 26, 2014, 14 pages.
Foreign Communication From A Counterpart Application, European Application No. 15893605.4, Extended European Search Report dated Feb. 9, 2018, 8 pages.
Machine Translation and Abstract of Chinese Publication No. CN101119158, Feb. 6, 2008, 5 pages.
Machine Translation and Abstract of Chinese Publication No. CN101902662, Dec. 1, 2010, 14 pages.
Machine Translation and Abstract of Chinese Publication No. CN102170421, Aug. 31, 2011, 9 pages.
Machine Translation and Abstract of Chinese Publication No. CN103905236, Jul. 2, 2014, 8 pages.
Machine Translation and Abstract of Chinese Publication No. CN104469561, Mar. 25, 2015, 12 pages.
"Series G: Transmission Systems and Media, Digital Systems and Networks, Digital sections and digital line system—Optical line systems for local and access networks," ITU-T G.984.3, Jan. 2014, 170 pages.
Foreign Communication From a Counterpart Application, PCT Application No. PCT/CN2015/080293, English Translation of International Search Report dated Feb. 29, 2016, 2 pages.
Foreign Communication From a Counterpart Application, Indian Application No. 201747031878, Indian Office Action dated Dec. 16, 2019, 6 pages.

* cited by examiner

METHOD FOR AUTHENTICATING OPTICAL NETWORK UNIT, OPTICAL LINE TERMINAL, AND OPTICAL NETWORK UNIT

CROSS-REFERENCE TO RELATED APPLICATIONS

This application is a continuation application of International Application No. PCT/CN2015/080293, filed on May 29, 2015. The disclosure of the aforementioned application is hereby incorporated herein by reference in its entirety.

TECHNICAL FIELD

The disclosure relates to the field of communications technologies, and more specifically, to a method for authenticating an optical network unit, an optical line terminal in the optical network unit, and an optical network unit.

BACKGROUND

A Passive Optical Network (PON) technology can significantly save fiber resources, and has currently been widely applied to the access field. A PON network generally includes an Optical Line Terminal (OLT), a Passive Optical Splitter (POS), and an Optical Network Unit (ONU). Generally, multiple ONU's are connected to a single PON interface of the OLT. To control access of the ONUs, an authentication mechanism needs to be used between the OLT and the ONUs. That is, when an ONU goes online, the OLT needs to authenticate whether the ONU is an authorized ONU, so as to determine whether to allow the ONU to be used in the current OLT.

Currently, in a frequently used method, the OLT detects whether ONU identification information of the ONU is consistent with local configuration data stored on the OLT. The ONU identification information mainly includes physical identification information of the ONU or logic identification information of the ONU. If the ONU identification information of the ONU is consistent with the local configuration data stored on the OLT, the OLT determines that authentication on the ONU succeeds, and authorizes the ONU to be an authorized ONU.

Therefore, when an ONU is migrated between OLTs that belong to different vendors, provided that authentication on ONU identification information of the ONU succeeds, the ONU is considered as an authorized ONU. Consequently, an ONU that belongs to a vendor may be randomly switched to an OLT of another vendor for use, and end-user loyalty to a vendor cannot be favorably increased.

SUMMARY

Embodiments of the disclosure provide a method for authenticating an ONU, and apparatuses for an OLT and an ONU. An ONU is not allowed to be migrated in an unauthorized manner to an OLT of another vendor for use, so as to bind the ONU and a vendor.

A first aspect of the embodiments of the disclosure provides a method for authenticating an ONU, applied to a PON system, and including, when an ONU goes online, obtaining, by an OLT, first vendor information of the ONU, where the first vendor information is vendor information of a vendor to which the ONU belongs; comparing, by the OLT, the first vendor information with second vendor information, where the second vendor information is vendor information of a vendor to which the OLT belongs; and if a comparison result indicates that the OLT and the ONU belong to different vendors, determining, by the OLT, that authentication on the ONU fails.

With reference to the first aspect of the embodiments of the disclosure, in a first implementation of the first aspect of the embodiments of the disclosure, obtaining, by an OLT, first vendor information of the ONU includes sending, by the OLT, a first message to the ONU, where the first message is used to query the first vendor information; and receiving, by the OLT, a second message that is sent by the ONU according to the first message, where the second message includes the first vendor information.

With reference to the first aspect of the embodiments of the disclosure or the first implementation of the first aspect of the embodiments of the disclosure, in a second implementation of the first aspect of the embodiments of the disclosure, after the determining, by the OLT, that authentication on the ONU fails, the method further includes sending, by the OLT, a third message to the ONU, where the third message is used to indicate that authentication on the first vendor information fails.

With reference to any one of the first aspect of the embodiments of the disclosure, or the first or the second implementation of the first aspect of the embodiments of the disclosure, in a third implementation of the first aspect of the embodiments of the disclosure, the method further includes, if the comparison result indicates that the OLT and the ONU belong to a same vendor, determining, by the OLT, that authentication on the ONU succeeds; and sending, by the OLT, a fourth message to the ONU, where the fourth message is used to indicate that authentication on the first vendor information succeeds.

A second aspect of the embodiments of the disclosure provides a method for authenticating an ONU, applied to a PON system, and including when an ONU goes online, sending, by the ONU, first vendor information to an OLT, where the first vendor information is vendor information of a vendor to which the ONU belongs; and receiving, by the ONU, a third message that is sent by the OLT according to the first vendor information, where the third message is used to indicate that authentication on the first vendor information fails, the third message is sent after the OLT determines that authentication on the ONU fails, that the OLT determines that authentication on the ONU fails is that the OLT compares the first vendor information with second vendor information and a comparison result indicates that the OLT and the ONU belong to different vendors, and the second vendor information is vendor information of a vendor to which the OLT belongs.

With reference to the second aspect of the embodiments of the disclosure, in a first implementation of the second aspect of the embodiments of the disclosure, after the sending, by the ONU, first vendor information to an OLT, the method further includes receiving, by the ONU, a fourth message that is sent by the OLT according to the first vendor information, where the fourth message is used to indicate that authentication on the first vendor information succeeds, the fourth message is sent after the OLT determines that authentication on the ONU succeeds, and that the OLT determines that authentication on the ONU succeeds is that the OLT compares the first vendor information with the second vendor information and the comparison result indicates that the OLT and the ONU belong to a same vendor.

With reference to the second aspect of the embodiments of the disclosure or the first implementation of the second aspect of the embodiments of the disclosure, in a second implementation of the second aspect of the embodiments of the disclosure, after the receiving, by the ONU, a third message that is sent by the OLT according to the first vendor information, the method further includes actively going, by the ONU, offline.

With reference to any one of the second aspect of the embodiments of the disclosure, or the first or the second implementation of the second aspect of the embodiments of the disclosure, in a third implementation of the second aspect of the embodiments of the disclosure, before the sending, by the ONU, first vendor information to an OLT, the method further includes receiving, by the ONU, a first message sent by the OLT, where the first message is used to query the first vendor information; and the sending, by the ONU, first vendor information to an OLT includes sending, by the ONU according to the first message, a second message including the first vendor information to the OLT.

A third aspect of the embodiments of the disclosure provides an OLT, applied to a PON system, and includes an obtaining unit configured to, when an ONU goes online, obtain first vendor information of the ONU, where the first vendor information is vendor information of a vendor to which the ONU belongs; a comparison unit configured to compare the first vendor information with second vendor information, where the second vendor information is vendor information of a vendor to which the OLT belongs; and a determining unit configured to, if a comparison result indicates that the OLT and the ONU belong to different vendors, determine that authentication on the ONU fails.

With reference to the third aspect of the embodiments of the disclosure, in a first implementation of the third aspect of the embodiments of the disclosure, the obtaining unit includes a sending module configured to send a first message to the ONU, where the first message is used to query the first vendor information; and a receiving module configured to receive a second message that is sent by the ONU according to the first message, where the second message includes the first vendor information.

With reference to the third aspect of the embodiments of the disclosure or the first implementation of the third aspect of the embodiments of the disclosure, in a second implementation of the third aspect of the embodiments of the disclosure, the OLT further includes a sending unit configured to, after the OLT determines that authentication on the ONU fails, send a third message to the ONU, where the third message is used to indicate that authentication on the first vendor information fails.

With reference to any one of the third aspect of the embodiments of the disclosure, or the first or the second implementation of the third aspect, in a third implementation of the third aspect of the embodiments of the disclosure, the determining unit is further configured to, if the comparison result indicates that the OLT and the ONU belong to a same vendor, determine that authentication on the ONU succeeds; and the sending unit is further configured to, after the OLT determines that authentication on the ONU succeeds, send a fourth message to the ONU, where the fourth message is used to indicate that authentication on the first vendor information succeeds.

A fourth aspect of the embodiments of the disclosure provides an ONU, applied to a PON system, and including a sending unit configured to, when the ONU goes online, send first vendor information to an OLT, where the first vendor information is vendor information of a vendor to which the ONU belongs; and a receiving unit configured to receive a third message that is sent by the OLT according to the first vendor information, where the third message is used to indicate that authentication on the first vendor information fails, the third message is sent after the OLT determines that authentication on the ONU fails, that the OLT determines that authentication on the ONU fails is that the OLT compares the first vendor information with second vendor information and a comparison result indicates that the OLT and the ONU belong to different vendors, and the second vendor information is vendor information of a vendor to which the OLT belongs.

With reference to the fourth aspect of the embodiments of the disclosure, in a first implementation of the fourth aspect of the embodiments of the disclosure, the receiving unit is further configured to, after the ONU sends the first vendor information to the OLT, receive a fourth message that is sent by the OLT according to the first vendor information, where the fourth message is used to indicate that authentication on the first vendor information succeeds, the fourth message is sent after the OLT determines that authentication on the ONU succeeds, and that the OLT determines that authentication on the ONU succeeds is that the OLT compares the first vendor information with the second vendor information and the comparison result indicates that the OLT and the ONU belong to a same vendor.

With reference to the fourth aspect of the embodiments of the disclosure or the first implementation of the fourth aspect of the embodiments of the disclosure, in a second implementation of the fourth aspect of the embodiments of the disclosure, the ONU further includes an execution unit configured to, after the ONU receives the third message that is sent by the OLT according to the first vendor information, perform a procedure of actively going, by the ONU, offline.

With reference to any one of the fourth aspect of the embodiments of the disclosure, or the first or the second implementation of the fourth aspect of the embodiments of the disclosure, in a third implementation of the fourth aspect of the embodiments of the disclosure, the receiving unit is further configured to, before the ONU sends the first vendor information to the OLT, receive a first message sent by the OLT, where the first message is used to query the first vendor information; and the sending unit is specifically configured to send, according to the first message, a second message including the first vendor information to the OLT.

In the technical solutions provided in the embodiments of the disclosure, when an ONU goes online, an OLT obtains first vendor information of the ONU, where the first vendor information is vendor information of a vendor to which the ONU belongs; and then compares the first vendor information with second vendor information, where the second vendor information is vendor information of a vendor to which the OLT belongs; if a comparison result indicates that the OLT and the ONU belong to different vendors, the OLT determines that authentication on the ONU fails. Therefore, compared with the prior art, in the embodiments of the disclosure, when the ONU goes online, authentication is performed on the vendor information of the vendor to which the ONU belongs. When the OLT and the ONU belong to different vendors, the OLT determines that authentication on the ONU fails, that is, the ONU is considered as an authorized ONU. In this case, the ONU is not allowed to be used in the OLT of the current vendor. Therefore, the ONU may be restricted from being used in an OLT of another vendor, so as to bind the ONU and the vendor, thereby favorably increasing end-user loyalty to a vendor and improving market competitiveness of the vendor.

DESCRIPTION OF EMBODIMENTS

Embodiments of the disclosure provide a method for authenticating an ONU, and devices for an OLT and an ONU. An ONU is not allowed to be migrated in an unauthorized manner to an OLT of another vendor for use, so as to bind the ONU and a vendor. Details are described below.

The following clearly describes the technical solutions in the embodiments of the disclosure with reference to the accompanying drawings in the embodiments of the disclosure. The described embodiments are merely some but not all of the embodiments of the disclosure. All other embodiments obtained by persons skilled in the art based on the embodiments of the disclosure without creative efforts shall fall within the protection scope of the disclosure.

In the specification, claims, and accompanying drawings of the disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
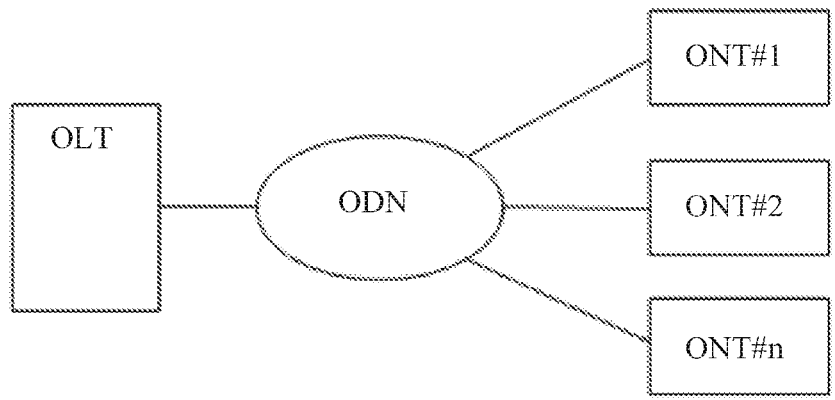
FIG. 1 is a schematic structural diagram of a PON system according to an embodiment of the disclosure.

It should be noted that the embodiments of the disclosure are applied to a PON system. The PON system may be a PON system based on a Gigabit-capable Passive Optical Network (GPON) standard, or may be a PON system based on an Ethernet Passive Optical Network (EPON) standard. As shown in FIG. 1, FIG. 1 is a schematic structural diagram of a PON system according to an embodiment of the disclosure. In this embodiment, the PON system includes an OLT and n ONUs of a terminal, where n is greater than or equal to 1, and the OLT connects and manages the n ONUs by using an ODN. It should be noted that an ONU in this embodiment is a client device in the PON system, and may further include an Optical network Terminal (ONT).

Figure 2:
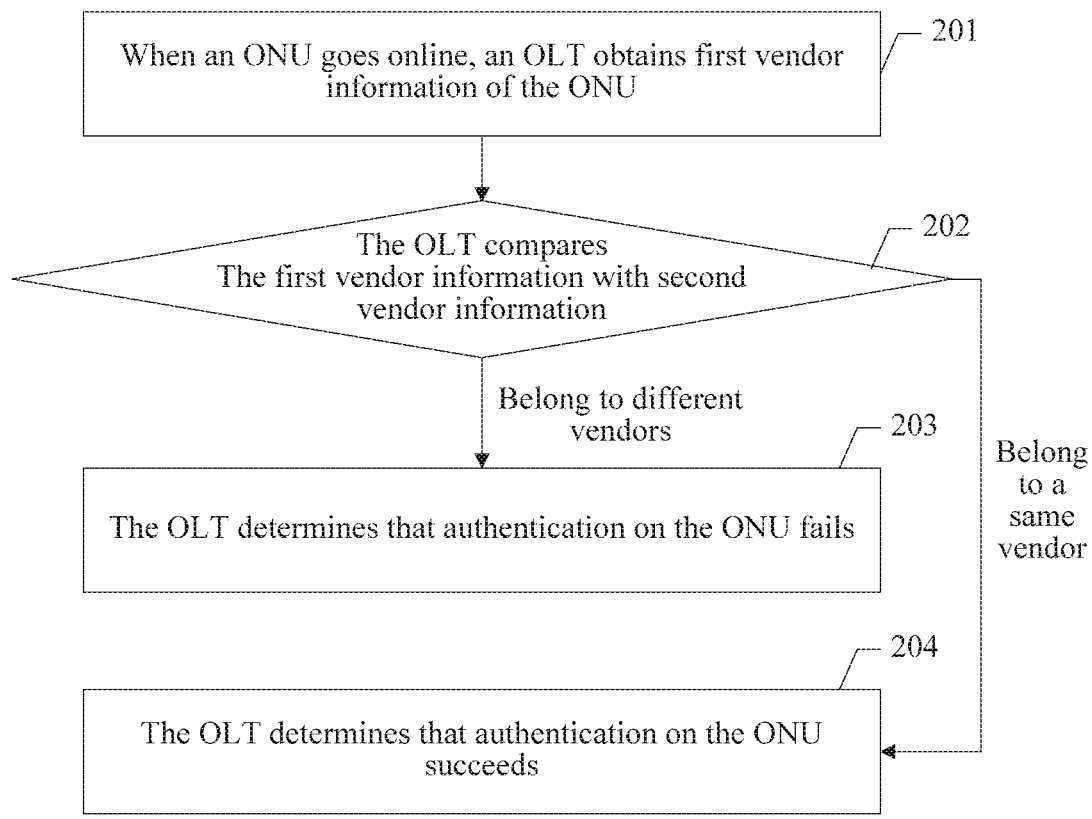
FIG. 2 is a schematic diagram of an embodiment of a method for authenticating an ONU according to embodiments of the disclosure.

A method for authenticating an ONU in this embodiment of the disclosure is described below from a perspective of an OLT. Referring to FIG. 2, an embodiment of the method for authenticating an ONU according to embodiments of the disclosure includes the following steps.

Step 201: When an ONU goes online, the OLT obtains first vendor information of the ONU.

In this embodiment, only an authorized ONU can be used in the OLT in step 201. Therefore, when the ONU goes online, the OLT needs to start an ONU authentication procedure, so as to determine whether to authorize the ONU to be an authorized ONU. It should be noted that in the ONU authentication procedure in this embodiment of the disclosure, the OLT obtains the first vendor information of the ONU. The first vendor information is vendor information of a vendor to which the ONU belongs.

It may be understood that the vendor information in this embodiment is used to uniquely identify the vendor. Optionally, the vendor information may be a string managed by the vendor. Specifically, specific content and a length of the string are not limited herein, or may be another form of identifier that can uniquely identity the vendor, provided that the OLT can identify a corresponding vendor according to the identifier. Specifically, a specific form of the vendor information is not limited herein.

Optionally, in this embodiment, the ONU authentication procedure may be actively initiated by the OLT, or may be actively initiated by the ONU. That the OLT obtains first vendor information of the ONU may include sending, by the OLT, a first message to the ONU, where the first message is used to query the first vendor information; and receiving, by the OLT, a second message that is sent by the ONU according to the first message, where the second message includes the first vendor information. As can be learned from the foregoing manner of obtaining the first vendor information, the OLT obtains the first vendor information in a manner of an active request. That is, the ONU reports the first vendor information to the OLT only after receiving the first message used to query the first vendor information. It may be understood that in some other embodiments, the ONU may alternatively report the first vendor information to the OLT in a manner of an active report. For example, the ONU reports the first vendor information to the OLT as soon as the ONU goes online. Alternatively, the ONU starts a timer after going online, and actively reports the first vendor information to the OLT when the timer exceeds a threshold. Alternatively, the ONU actively reports the first vendor information to the OLT after learning that authentication on ONU identification information succeeds. Alternatively, the ONU adds the first vendor information to ONU identification information that is sent by the ONU to the OLT. It may be understood that during actual application, the OLT may obtain the first vendor information of the ONU in other manners. Specifically, a specific manner in which the OLT obtains the first vendor information of the ONU is not specifically limited herein.

202: The OLT compares the first vendor information with second vendor information, and if a comparison result indicates that the OLT and the ONU belong to different vendors, performs step 203.

In this embodiment, the second vendor information is vendor information of a vendor to which the OLT belongs. Specifically, herein, for a specific form of the second vendor information, refer to the description in step 201. It may be understood that during actual application, actual forms of the second vendor information and the first vendor information may be the same or may be different. For example, both the second vendor information and the first vendor information are corresponding vendor strings. Alternatively, the second vendor information is a Public Land Mobile Network (PLMN) value of the vendor, and the first vendor information is a vendor string stored in the ONU.

After obtaining the first vendor information and the second vendor information, the OLT compares the first vendor information with the second vendor information to determine whether the OLT and the ONU belong to different vendors. If the comparison result indicates that the OLT and the ONU belong to different vendors, the OLT performs step 203.

Step 203: The OLT determines that authentication on the ONU fails.

In this embodiment, if the comparison result indicates that the OLT and the ONU belong to different vendors, the OLT determines that authentication on the ONU fails. As can be learned, when the ONU is migrated to an OLT of a vendor, if the vendor is different from a vendor to which the ONU belongs, the OLT considers the ONU as an authorized ONU, and does not allow the ONU to be used in the OLT of the current vendor.

Optionally, this embodiment may further include the following step.

Step 204: If the comparison result indicates that the OLT and the ONU belong to a same vendor, the OLT determines that authentication on the ONU succeeds.

In this embodiment, when the OLT compares the first vendor information with the second vendor information, if the comparison result indicates that the OLT and the ONU belong to a same vendor, the OLT determines that authentication on the ONU succeeds. Therefore, the OLT considers the ONU as an authorized ONU, and allows the ONU to be used in the OLT of the current vendor.

It may be understood that in this embodiment, if the comparison result indicates that the OLT and the ONU belong to a same vendor, the OLT may further authenticate other information (for example, the ONU identification information) of the ONU. The OLT determines that authentication on the ONU succeeds only after determining that authentication on the information of the ONU succeeds. Certainly, in some embodiments, alternatively, the OLT may have authenticated other information (for example, the ONU identification information) of the ONU before authenticating the first vendor information of the ONU, and performs step 201 only when determining that authentication on the information succeeds. Therefore, this embodiment of the disclosure may further include, before the OLT obtains the first vendor information of the ONU, determining, by the OLT, that authentication on the ONU identification information of the ONU succeeds. It may be understood that in some embodiments, authentication on the ONU identification information and authentication on the first vendor information of the ONU may be simultaneously performed.

Optionally, this embodiment may further include delivering a vendor info check state to the ONU. For example, when determining that authentication on the ONU fails, the OLT sends a third message to the ONU, where the third message is used to indicate that authentication on the first vendor information fails. When determining that authentication on the ONU succeeds, the OLT sends a fourth message to the ONU, where the fourth message is used to indicate that authentication on the first vendor information succeeds.

Optionally, in this embodiment, the first vendor information may be vendor information preset in a memory of the ONU before delivery, or the first vendor information may be vendor information that is sent by an OLT and that is of a vendor to which the OLT belongs. When determining that the first vendor information is null, an OLT sends, to the ONU, vendor information of a vendor to which the OLT belongs. Herein, a specific process in which the first vendor information is vendor information that is sent by an OLT and that is of a vendor to which the OLT belongs is described in detail in a subsequent embodiment.

In the technical solution provided in this embodiment of the disclosure, when an ONU goes online, an OLT obtains first vendor information of the ONU, where the first vendor information is vendor information of a vendor to which the ONU belongs; and then compares the first vendor information with second vendor information, where the second vendor information is vendor information of a vendor to which the OLT belongs; if a comparison result indicates that the OLT and the ONU belong to different vendors, the OLT determines that authentication on the ONU fails. Therefore, compared with the prior art, in this embodiment of the disclosure, when the ONU goes online, authentication is performed on the vendor information of the vendor to which the ONU belongs. When the OLT and the ONU belong to different vendors, the OLT determines that authentication on the ONU fails, that is, the ONU is considered as an authorized ONU. In this case, the ONU is not allowed to be used in the OLT of the current vendor. Therefore, it may be ensured that the ONU is limited to being used in the OLT of the vendor to which the ONU belongs and cannot be migrated to an OLT of another vendor for use, so as to bind the ONU and the vendor, thereby favorably increasing end-user loyalty to a vendor and improving market competitiveness of the vendor.

Figure 3:
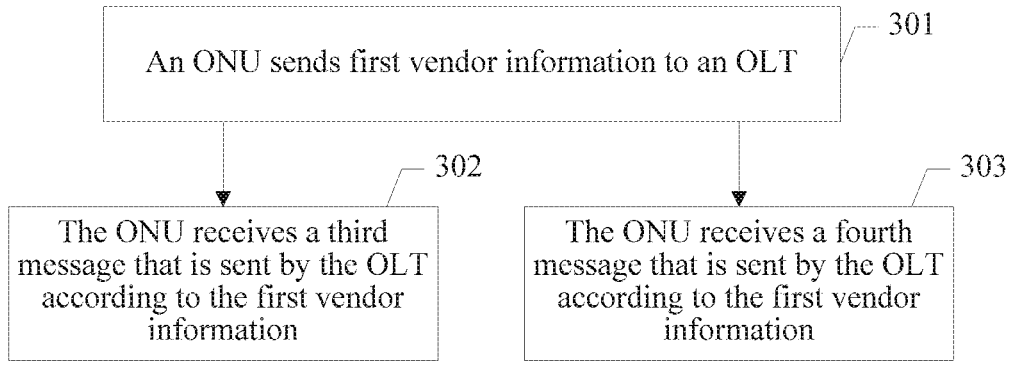
FIG. 3 is a schematic diagram of another embodiment of a method for authenticating an ONU according to embodiments of the disclosure.

A method for authenticating an ONU in this embodiment of the disclosure is described below from a perspective of an ONU. Referring to FIG. 3, another embodiment of the method for authenticating an ONU according to an embodiment of the disclosure includes the following steps.

Step 301: The ONU sends first vendor information to an OLT.

In this embodiment, only an authorized ONU can be used in the current OLT. Therefore, when the ONU goes online, an ONU authentication procedure is to be performed on the ONU, so that the OLT authorizes the ONU and allows the ONU to work in the current OLT. The first vendor information is vendor information of a vendor to which the ONU belongs. Specifically, for a specific form of the vendor information herein, refer to the description of step 201 in the embodiment shown in FIG. 2, and details are not described herein again.

Optionally, in this embodiment, when the ONU sends the first vendor information to the OLT, the ONU may actively report the first vendor information to the OLT. For details, refer to the description of step 201 in the embodiment shown in FIG. 2. Alternatively, the ONU may send the first vendor information to the OLT after receiving a trigger instruction sent by the OLT. For example, before the ONU sends the first vendor information to the OLT, this embodiment further includes receiving, by the ONU, a first message sent by the OLT. The first message is used to query the first vendor information. Step 301 specifically includes sending, by the ONU according to the first message, a second message including the first vendor information to the OLT.

Step 302: The ONU receives a third message that is sent by the OLT according to the first vendor information.

In this embodiment, the third message is used to indicate that authentication on the first vendor information fails. The third message is sent after the OLT determines that authentication on the ONU fails. That the OLT determines that authentication on the ONU fails is that the OLT compares the first vendor information with second vendor information and a comparison result indicates that the OLT and the ONU belong to different vendors. Herein, the second vendor information is vendor information of a vendor to which the OLT belongs. For a specific form of the second vendor information, refer to the description of step 202 in the embodiment shown in FIG. 2. Therefore, it may be understood that after receiving the first vendor information sent by the ONU, the OLT compares the first vendor information with the second vendor information. If the comparison result indicates that the OLT and the ONU belong to different vendors, the OLT determines that authentication on the ONU fails, and sends the third message to the ONU, so that the ONU learns that the ONU is an authorized ONU, and the ONU actively goes offline.

As can be learned, when the ONU is migrated to an OLT of a vendor, if the vendor is different from a vendor to which the ONU belongs, the OLT considers the ONU as an authorized ONU, and sends the third message to the ONU, so that the ONU may perform, according to the third message, a corresponding processing operation performed after authentication fails. For example, the ONU actively goes offline. It may be understood that in some other embodiments, the processing operation performed after authentication fails may further include another processing manner. Details are not limited herein.

Optionally, this embodiment may further include the following step.

Step 303: The ONU receives a fourth message that is sent by the OLT according to the first vendor information.

In this embodiment, the fourth message is used to indicate that authentication on the first vendor information succeeds, and the fourth message is sent after the OLT determines that authentication on the ONU succeeds. That the OLT determines that authentication on the ONU succeeds is that the OLT compares the first vendor information with the second vendor information and the comparison result indicates that the OLT and the ONU belong to a same vendor. Therefore, it may be understood that after receiving the first vendor information sent by the ONU, the OLT compares the first vendor information with the second vendor information. If the comparison result indicates that the OLT and the ONU belong to a same vendor, the OLT determines that authentication on the ONU succeeds, and sends the fourth message to the ONU, so that the ONU learns that the ONU is an authorized ONU.

As can be learned, when the ONU is migrated to an OLT of a vendor, if the vendor is the same as the vendor to which the ONU belongs, the OLT considers the ONU as an authorized ONU, and sends the fourth message to the ONU, so that the ONU may perform, according to the fourth message, a corresponding processing operation performed after authentication succeeds. For example, after learning that authentication on the ONU succeeds, the ONU enters an authorized state, and starts to receive service configuration data delivered by the OLT. In some other embodiments, the processing operation performed after authentication succeeds may further include another processing manner. Details are not limited herein.

Optionally, in this embodiment, the first vendor information may be vendor information preset in a memory of the ONU before delivery, or the first vendor information may be vendor information that is sent by an OLT and that is of a vendor to which the OLT belongs. When determining that the first vendor information is null, an OLT sends, to the ONU, vendor information of a vendor to which the OLT belongs. Herein, a specific process in which the first vendor information is vendor information that is sent by an OLT and that is of a vendor to which the OLT belongs is described in detail in a subsequent embodiment.

In the technical solution provided in this embodiment of the disclosure, when going online, an ONU sends first vendor information to an OLT, where the first vendor information is vendor information of a vendor to which the ONU belongs; and the ONU receives a third message that is sent by the OLT according to the first vendor information, where the third message is used to indicate that authentication on the first vendor information fails, the third message is sent after the OLT determines that authentication on the ONU fails, that the OLT determines that authentication on the ONU fails is that the OLT compares the first vendor information with second vendor information and a comparison result indicates that the OLT and the ONU belong to different vendors, and the second vendor information is vendor information of a vendor to which the OLT belongs. Therefore, compared with the prior art, in this embodiment of the disclosure, when the ONU goes online, authentication on the vendor information is to be performed on the ONU. When the OLT and the ONU belong to different vendors, the ONU receives the third message that is sent by the OLT according to the first vendor information, to learn that the ONU is an authorized ONU and cannot be used in the OLT of the current vendor. Therefore, it may be ensured that the ONU is limited to being used in the OLT of the vendor to which the OLT belongs, and cannot be migrated in an authorized manner to an OLT of another vendor for use, so as to bind the ONU and the vendor, thereby favorably increasing end-user loyalty to a vendor and improving market competitiveness of the vendor.

Figure 4:
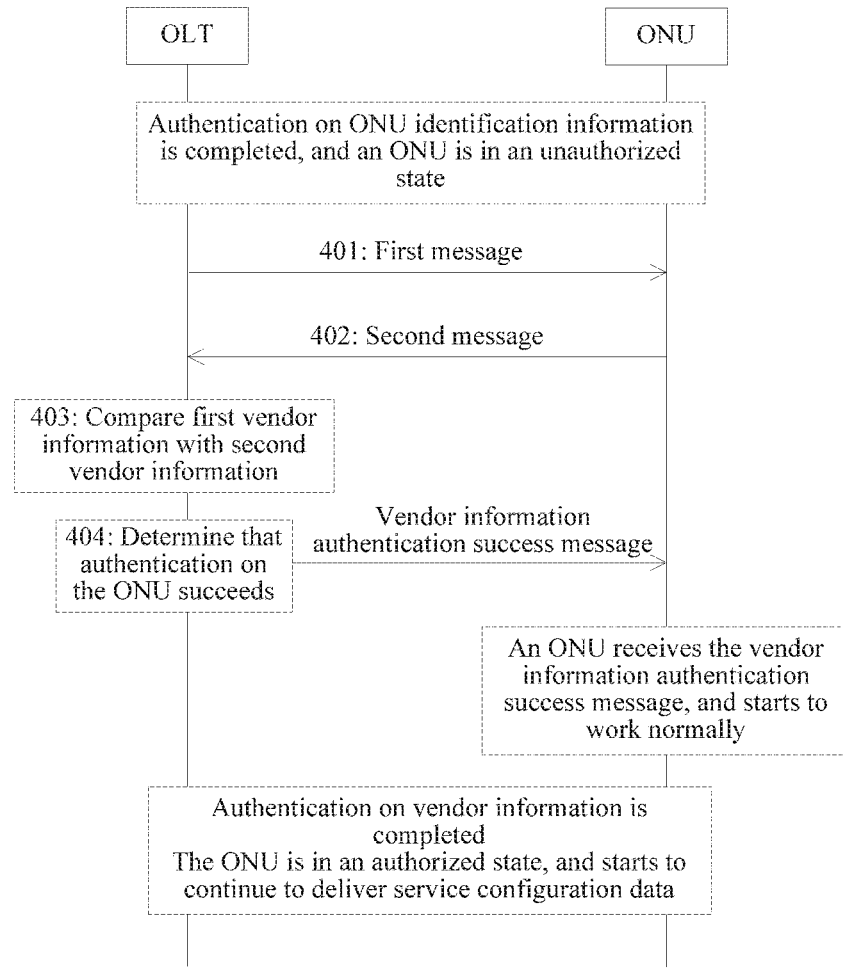
FIG. 4 is a schematic diagram of another embodiment of a method for authenticating an ONU according to embodiments of the disclosure.

A method for authenticating an ONU in this embodiment of the disclosure is described below by using an application scenario in which authentication on an OLT succeeds. Referring to FIG. 4, an embodiment of the method for authenticating an ONU according to embodiments of the disclosure includes the following steps.

It should be noted that in this embodiment, when an ONU goes online, an Optical network unit Management and Control Channel (OMCC) has been established between the OLT and the ONU, and the ONU is in an O5 state described in International Telecommunication Union Telecommunication (ITUT) standard G.984.3. In this case, before the ONU is authorized by the OLT as an authorized ONU, the OLT needs to start an ONU authentication procedure to determine whether to authorize the ONU as an authorized ONU.

In this embodiment, the OLT may first authenticate ONU identification information of the ONU. After the OLT determines that authentication on the ONU identification information of the ONU succeeds, this embodiment further includes the following steps.

Step 401: The OLT delivers a first message to the ONU.

In this embodiment, the first message is used to query first vendor information. The first vendor information is vendor information of a vendor to which the ONU belongs. For example, in this embodiment, the first message may be a message for querying information about the vendor to which the ONU belongs, or may be a message of another name that has a same function.

Step 402: The ONU reports a second message to the OLT.

In this embodiment, the first message includes the first vendor information.

Step 403: The OLT compares first vendor information with second vendor information locally stored in the OLT, and if a comparison result indicates that the OLT and the ONU belong to a same vendor, performs step 404.

In this embodiment, the second vendor information is vendor information of a vendor to which the OLT belongs, and is locally stored in the OLT.

Step 404: The OLT determines that authentication on the ONU succeeds, and delivers a vendor information authentication success message to the ONU.

In this embodiment, a vendor info check state attribute may be added by using an ONU second-generation (2-G) entity in an extended standard ONT management and control interface (OMCI) protocol. For example, 0 represents that authentication is being performed, 1 represents that authentication succeeds, and 2 represents that authentication fails. Therefore, when determining that authentication on the ONU succeeds, the OLT sets the vendor info check state to 1, and can therefore obtain the vendor information authentication success message.

In this case, the ONU learns an OLT to which the ONU is connected and that is of a home vendor, and enters an authorized state. The OLT may start to deliver service configuration data.

Figure 5:
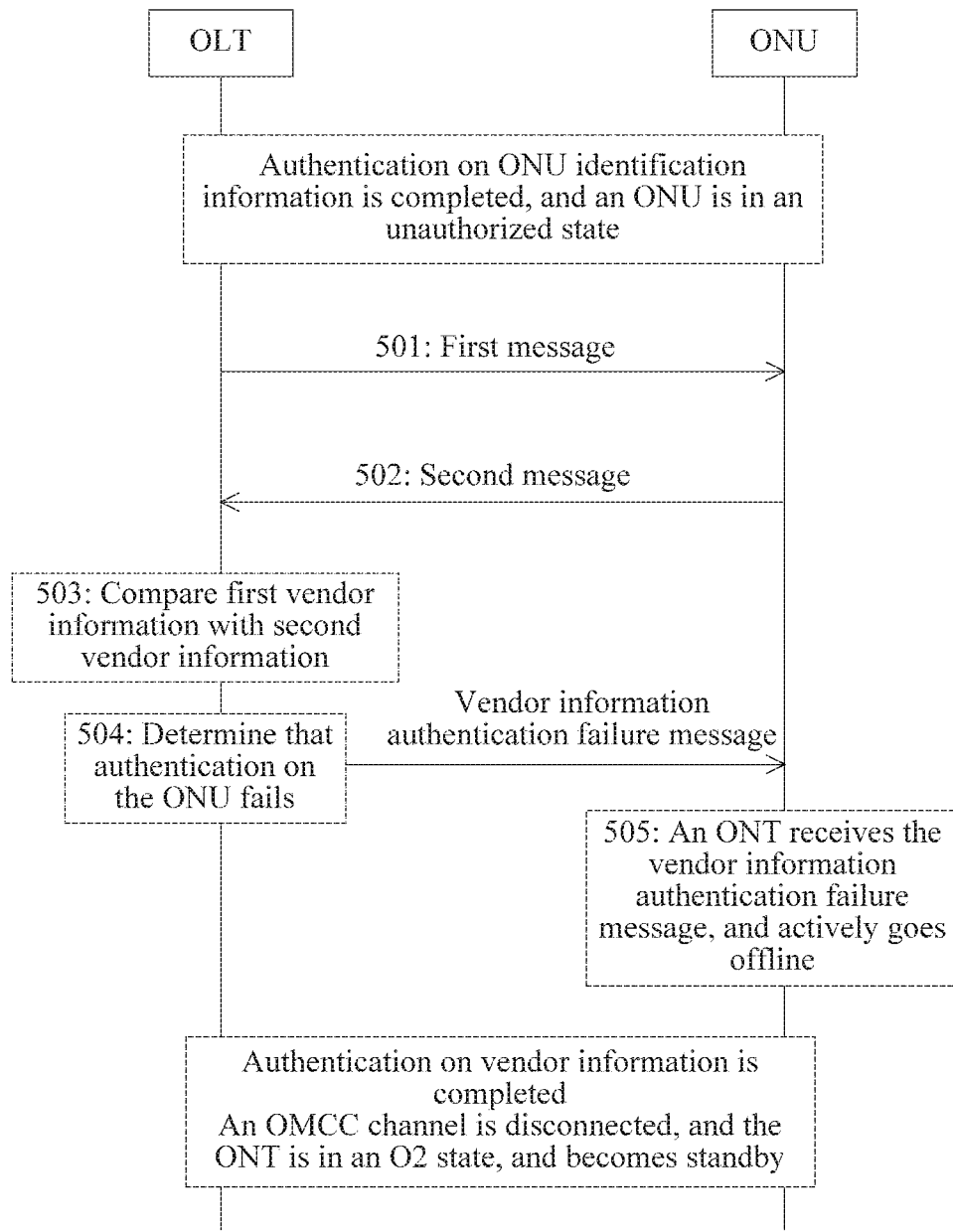
FIG. 5 is a schematic diagram of another embodiment of a method for authenticating an ONU according to embodiments of the disclosure.

A method for authenticating an ONU in this embodiment of the disclosure is described below by using an application scenario in which authentication on an OLT fails. Referring to FIG. 5, an embodiment of the method for authenticating an ONU according to embodiments of the disclosure includes the following steps.

It should be noted that in this embodiment, when an ONU goes online, an OMCC channel has been established between the OLT and the ONU, and the ONU is in an O5 state described in ITUT G.984.3. In this case, before the ONU is authorized by the OLT as an authorized ONU, the OLT needs to start an ONU authentication procedure to determine whether to authorize the ONU as an authorized ONU.

In this embodiment, the OLT may first authenticate ONU identification information of the ONU. After the OLT determines that authentication on the ONU identification information of the ONU succeeds, this embodiment further includes the following steps.

Step 501: The OLT delivers a first message to the ONU.

Step 502: The ONU reports a second message to the OLT.

In this embodiment, processes of step 501 and step 502 are similar to those of step 401 and step 402 in the embodiment shown in FIG. 4, and details are not described herein again.

Step 503: The OLT compares first vendor information with second vendor information locally stored in the OLT, and if a comparison result indicates that the OLT and the ONU belong to different vendors, performs step 504.

In this embodiment, the second vendor information is vendor information of a vendor to which the OLT belongs, and is locally stored in the OLT.

Step 504: The OLT determines that authentication on the ONU fails, and delivers a vendor information authentication failure message to the ONU.

For example, referring to the description of step 404 in the embodiment shown in FIG. 4, in this embodiment, when determining that authentication on the ONU fails, the OLT may set the vendor info check state to 2, to obtain the vendor information authentication failure message.

Step 505: The ONU actively goes offline.

In this embodiment, after receiving the vendor information authentication failure message, the ONU learns an OLT to which the ONU is connected and that is of a non-home vendor. Therefore, the ONU determines that the ONU is an unauthorized migrated ONU, and actively goes offline. Then, the OMCC channel between the OLT and the ONU is disconnected. The ONU enters an O2 state, and becomes standby.

It may be understood that in some other embodiments, the OLT may simultaneously authenticate the ONU identification information and the vendor information, or authenticate the vendor information and then authenticate the ONU identification information. Details are not limited herein.

Figure 6:
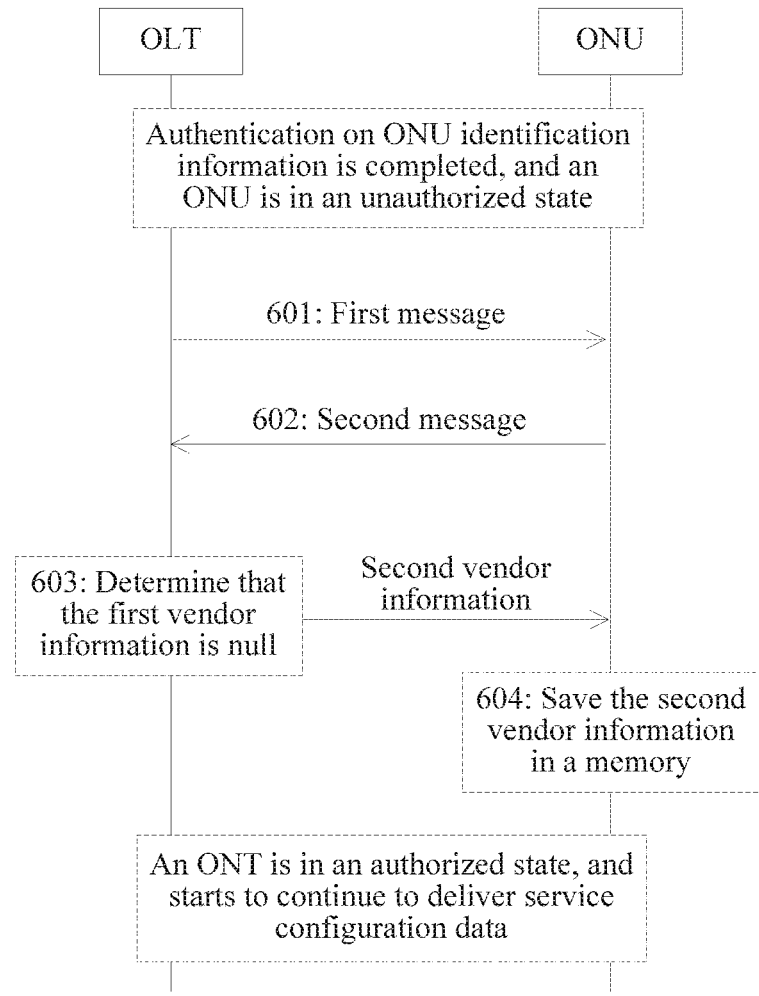
FIG. 6 is a schematic flowchart showing that an OLT delivers second vendor information to an ONU according to an embodiment of the disclosure.

Referring to FIG. 6, a specific process in which first vendor information is vendor information that is sent by an OLT and that is of a vendor to which the OLT belongs is described in detail below.

When an ONU is used for the first time, if no vendor information is preset in the ONU, the OLT actively delivers the vendor information of the vendor to which the OLT belongs to the ONU. A specific procedure includes the following steps.

Step 601: when the ONU goes online, the OLT delivers a first message to the ONU.

Step 602: The ONU reports a second message to the OLT.

Herein, processes of step 601 and step 602 are similar to those of step 401 and step 402 in the embodiment shown in FIG. 4, and details are not described herein again.

Step 603: The OLT determines that first vendor information is null, and delivers second vendor information to the ONU.

The second vendor information is the vendor information of the vendor to which the OLT belongs, and is locally stored in the OLT.

Step 604: The ONU saves the second vendor information in a memory.

For example, the ONU may save the second vendor information in a flash memory (FLASH) of the ONU. In subsequent authentication on the ONU, the second vendor information is used as vendor information of a vendor to which the ONU belongs.

It may be understood that in an application scenario in which the ONU is used for the first time and no vendor information is preset in the ONU, after step 603 is performed, the ONU enters an authorized state, and the OLT may start to deliver service configuration data.

Figure 7:
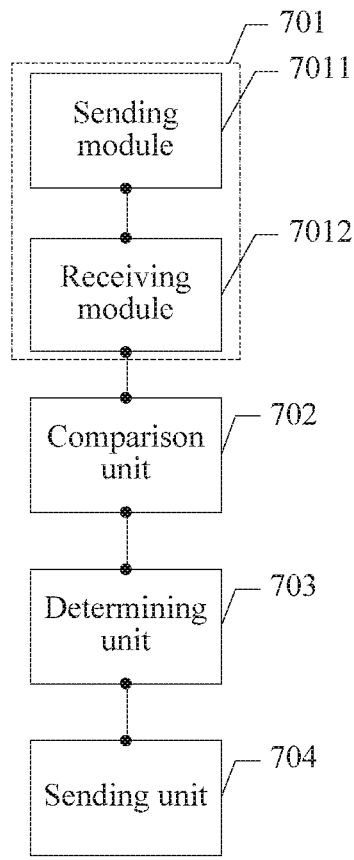
FIG. 7 is a schematic diagram of an embodiment of an OLT according to embodiments of the disclosure.

The method for authenticating an ONU in the embodiments of the disclosure is described above. An OLT in an embodiment of the disclosure is described below. Referring to FIG. 7, an embodiment of the OLT according to embodiments of the disclosure includes the following.

It may be understood that the OLT in this embodiment of the disclosure may implement the procedure of the embodiment shown in FIG. 2. The OLT includes an obtaining unit 701 configured to, when an ONU goes online, obtain first vendor information of the ONU, where the first vendor information is vendor information of a vendor to which the ONU belongs; a comparison unit 702 configured to compare the first vendor information with second vendor information, where the second vendor information is vendor information of a vendor to which the OLT belongs; and a determining unit 703 configured to, if a comparison result indicates that the OLT and the ONU belong to different vendors, determine that authentication on the ONU fails.

For ease of understanding, an internal operation procedure of the OLT in this embodiment is described below by using a specific application scenario as an example.

When the ONU goes online, the obtaining unit 701 obtains the first vendor information of the ONU, where the first vendor information is vendor information of a vendor to which the ONU belongs; the comparison unit 702 compares the first vendor information with the second vendor information, where the second vendor information is vendor information of a vendor to which the OLT belongs; and if the comparison result indicates that the OLT and the ONU belong to different vendors, the determining unit 703 determines that authentication on the ONU fails.

Optionally, in this embodiment, the obtaining unit 701 may include a sending module 7011 configured to send a first message to the ONU, where the first message is used to query the first vendor information; and a receiving module 7012 configured to receive a second message that is sent by the ONU according to the first message, where the second message includes the first vendor information.

Optionally, in this embodiment, the OLT may further include a sending unit 704 configured to, after the OLT determines that authentication on the ONU fails, send a third message to the ONU, where the third message is used to indicate that authentication on the first vendor information fails.

Optionally, in this embodiment, the determining unit 703 is further configured to, if the comparison result indicates that the OLT and the ONU belong to a same vendor, determine that authentication on the ONU succeeds.

Optionally, in this embodiment, the sending unit 704 may further be configured to, after the OLT determines that authentication on the ONU succeeds, send a fourth message to the ONU, where the fourth message is used to indicate that authentication on the first vendor information succeeds.

Optionally, in this embodiment, the first vendor information is vendor information preset in a memory of the ONU before delivery, or the first vendor information is vendor information that is sent by an OLT and that is of a vendor to which the OLT belongs. When determining that the first vendor information is null, an OLT sends vendor information of a vendor to which the OLT belongs to the ONU.

In the technical solution provided in this embodiment of the disclosure, when an ONU goes online, the obtaining unit 701 of the OLT obtains first vendor information of the ONU, where the first vendor information is vendor information of a vendor to which the ONU belongs; then the comparison unit 702 compares the first vendor information with second vendor information, where the second vendor information is vendor information of a vendor to which the OLT belongs; and if a comparison result indicates that the OLT and the ONU belong to different vendors, the determining unit 703 determines that authentication on the ONU fails. Therefore, compared with the prior art, in this embodiment of the disclosure, when the ONU goes online, authentication is performed on the vendor information of the vendor to which the ONU belongs. When the OLT and the ONU belong to different vendors, the OLT determines that authentication on the ONU fails, that is, the ONU is considered as an authorized ONU. In this case, the ONU is not allowed to be used in the OLT of the current vendor. Therefore, it may be ensured that the ONU is limited to being used in the OLT of the vendor to which the ONU belongs and cannot be migrated to an OLT of another vendor for use, so as to bind the ONU and the vendor, thereby favorably increasing end-user loyalty to a vendor and improving market competitiveness of the vendor.

Figure 8:
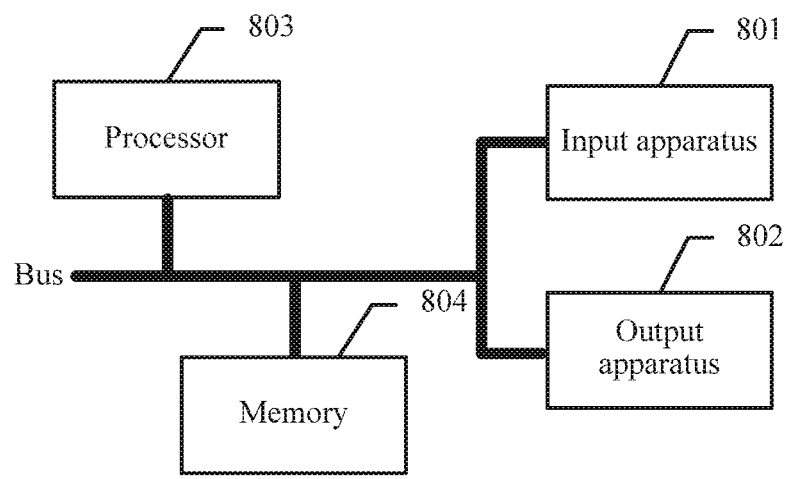
FIG. 8 is a schematic diagram of another embodiment of an OLT according to embodiments of the disclosure.

The OLT in this embodiment of the disclosure is described above from a perspective of modularizing a function entity. The OLT in this embodiment of the disclosure is described below from a perspective of hardware processing. Referring to FIG. 8, another embodiment of the OLT according to embodiments of the disclosure includes an input apparatus 801, an output apparatus 802, a processor 803, and a memory 804 (there may be one or more processors 803 in the OLT, and one processor 803 is used as an example in FIG. 8). In some embodiments of the disclosure, the input apparatus 801, the output apparatus 802, the processor 803, and the memory 804 may be connected by using a bus or in another manner.

The processor 803 is configured to perform the following steps by invoking an operation instruction stored in the memory 804 when an ONU goes online, obtaining first vendor information of the ONU, where the first vendor information is vendor information of a vendor to which the ONU belongs; comparing the first vendor information with second vendor information, where the second vendor information is vendor information of a vendor to which the OLT belongs; and if a comparison result indicates that the OLT and the ONU belong to different vendors, determining, by the OLT, that authentication on the ONU fails.

In some embodiments of the disclosure, the processor 803 may be specifically configured to perform the following steps. Sending a first message to the ONU, where the first message is used to query the first vendor information; and receiving a second message that is sent by the ONU according to the first message, where the second message includes the first vendor information.

In some embodiments of the disclosure, the processor 803 may further be configured to perform the following step. After the OLT determines that authentication on the ONU fails, sending a third message to the ONU, where the third message is used to indicate that authentication on the first vendor information fails.

In some embodiments of the disclosure, the processor 803 may further be configured to perform the following step. If the comparison result indicates that the OLT and the ONU belong to a same vendor, determining, by the OLT, that authentication on the ONU succeeds.

In some embodiments of the disclosure, the processor 803 may further be configured to perform the following step. After the OLT determines that authentication on the ONU succeeds, sending a fourth message to the ONU, where the fourth message is used to indicate that authentication on the first vendor information succeeds.

In some embodiments of the disclosure, the first vendor information is vendor information preset in a memory of the ONU before delivery, or the first vendor information is vendor information that is sent by an OLT and that is of a vendor to which the OLT belongs. When determining that the first vendor information is null, an OLT sends vendor information of a vendor to which the OLT belongs to the ONU.

In some embodiments of the disclosure, the processor 803 may further be configured to perform the following step. Before the OLT obtains the first vendor information of the ONU, determining that authentication on ONU identification information of the ONU succeeds.

Figure 9:
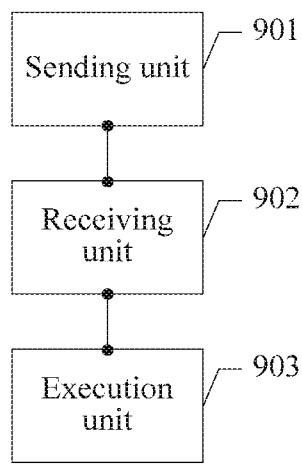
FIG. 9 is a schematic diagram of an embodiment of an ONU according to embodiments of the disclosure.

The method for authenticating an ONU and the OLT in the embodiments of the disclosure are described above. An ONU in an embodiment of the disclosure is described below. Referring to FIG. 9, an embodiment of the ONU according to embodiments of the disclosure includes the following.

It may be understood that the ONU in this embodiment of the disclosure may implement the procedure of the embodiment shown in FIG. 3. The ONU includes a sending unit 901 configured to, when the ONU goes online, send first vendor information to an OLT, where the first vendor information is vendor information of a vendor to which the ONU belongs; and a receiving unit 902 configured to receive a third message that is sent by the OLT according to the first vendor information, where the third message is used to indicate that authentication on the first vendor information fails, the third message is sent after the OLT determines that authentication on the ONU fails, that the OLT determines that authentication on the ONU fails is that the OLT compares the first vendor information with second vendor information and a comparison result indicates that the OLT and the ONU belong to different vendors, and the second vendor information is vendor information of a vendor to which the OLT belongs.

For ease of understanding, an internal operation procedure of the ONU in this embodiment is described below by using a specific application scenario as an example.

When the ONU goes online, the sending unit 901 sends first vendor information to the OLT, where the first vendor information is vendor information of a vendor to which the ONU belongs. The receiving unit 902 receives a third message that is sent by the OLT according to the first vendor information, where the third message is used to indicate that authentication on the first vendor information fails, the third message is sent after the OLT determines that authentication on the ONU fails, that the OLT determines that authentication on the ONU fails is that the OLT compares the first vendor information with second vendor information and a comparison result indicates that the OLT and the ONU belong to different vendors, and the second vendor information is vendor information of a vendor to which the OLT belongs.

Optionally, in this embodiment, the receiving unit 902 may further be configured to, after the ONU sends the first vendor information to the OLT, receive a fourth message that is sent by the OLT according to the first vendor information, where the fourth message is used to indicate that authentication on the first vendor information succeeds, the fourth message is sent after the OLT determines that authentication on the ONU succeeds, and that the OLT determines that authentication on the ONU succeeds is that the OLT compares the first vendor information with the second vendor information and the comparison result indicates that the OLT and the ONU belong to a same vendor.

Optionally, in this embodiment, the ONU may further include an execution unit 903 configured to, after the ONU receives the third message that is sent by the OLT according to the first vendor information, perform a procedure of actively going, by the ONU, offline.

Optionally, in this embodiment, the receiving unit 902 may further be configured to, before the ONU sends the first vendor information to the OLT, receive a first message sent by the OLT, where the first message is used to query the first vendor information, and the sending unit 901 is configured to send, according to the first message, a second message including the first vendor information to the OLT.

Optionally, in this embodiment, the first vendor information is vendor information preset in a memory of the ONU before delivery, or the first vendor information is vendor information that is sent by an OLT and that is of a vendor to which the OLT belongs. When determining that the first vendor information is null, an OLT sends vendor information of a vendor to which the OLT belongs to the ONU.

In the technical solution provided in this embodiment of the disclosure, when the ONU goes online, the sending unit 901 of the ONU sends first vendor information to an OLT, where the first vendor information is vendor information of a vendor to which the ONU belongs; and the receiving unit 902 receives a third message that is sent by the OLT according to the first vendor information, where the third message is used to indicate that authentication on the first vendor information fails, the third message is sent after the OLT determines that authentication on the ONU fails, that the OLT determines that authentication on the ONU fails is that the OLT compares the first vendor information with second vendor information and a comparison result indicates that the OLT and the ONU belong to different vendors, and the second vendor information is vendor information of a vendor to which the OLT belongs. Therefore, compared with the prior art, in this embodiment of the disclosure, when the ONU goes online, the ONU needs to perform authentication on the vendor information. When the OLT and the ONU belong to different vendors, the ONU receives the third message that is sent by the OLT according to the first vendor information, to learn that the ONU is an authorized ONU and cannot be used in the OLT of the current vendor. Therefore, it may be ensured that the ONU is limited to being used in the OLT of the vendor to which the OLT belongs, and cannot be migrated in an authorized manner to an OLT of another vendor for use, so as to bind the ONU and the vendor, thereby favorably increasing end-user loyalty to a vendor and improving market competitiveness of the vendor.

Figure 10:
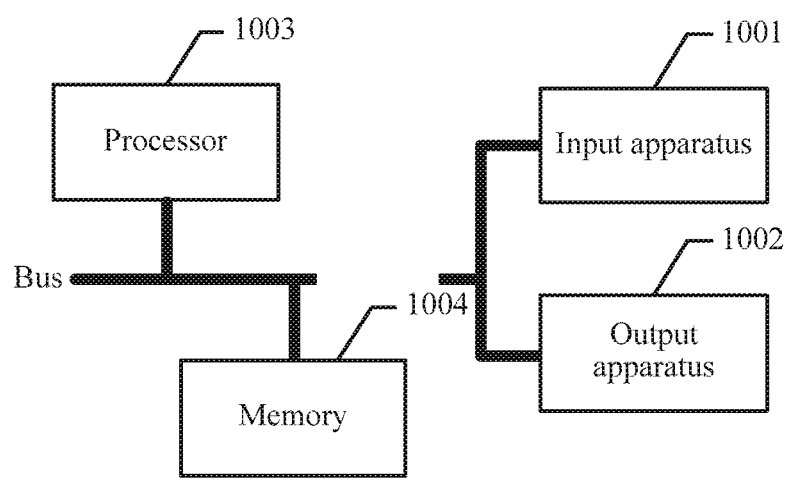
FIG. 10 is a schematic diagram of another embodiment of an ONU according to embodiments of the disclosure.

The ONU in this embodiment of the disclosure is described above from a perspective of modularizing a function entity. The ONU in this embodiment of the disclosure is described below from a perspective of hardware processing. Referring to FIG. 10, another embodiment of the ONU according to embodiments of the disclosure includes an input apparatus 1001, an output apparatus 1002, a processor 1003, and a memory 1004 (there may be one or more processors 1003 in the ONU, and one processor 1003 is used as an example in FIG. 10).

In some embodiments of the disclosure, the input apparatus 1001, the output apparatus 1002, the processor 1003, and the memory 1004 may be connected by using a bus or in another manner.

The processor 1003 is configured to perform the following steps by invoking an operation instruction stored in the memory 1004: when the ONU goes online, sending first vendor information to an OLT, where the first vendor information is vendor information of a vendor to which the ONU belongs; and receiving a third message that is sent by the OLT according to the first vendor information, where the third message is used to indicate that authentication on the first vendor information fails, the third message is sent after the OLT determines that authentication on the ONU fails, that the OLT determines that authentication on the ONU fails is that the OLT compares the first vendor information with second vendor information and a comparison result indicates that the OLT and the ONU belong to different vendors, and the second vendor information is vendor information of a vendor to which the OLT belongs.

In some embodiments of the disclosure, the processor 1003 may further be configured to perform the following steps. Receiving a fourth message that is sent by the OLT according to the first vendor information, where the fourth message is used to indicate that authentication on the first vendor information succeeds, the fourth message is sent after the OLT determines that authentication on the ONU succeeds, and that the OLT determines that authentication on the ONU succeeds is that the OLT compares the first vendor information with the second vendor information and the comparison result indicates that the OLT and the ONU belong to a same vendor; and after the ONU receives the third message that is sent by the OLT according to the first vendor information, executing a procedure of actively going, by the ONU, offline.

In some embodiments of the disclosure, the processor 1003 may further be configured to perform the following steps. Before the ONU sends the first vendor information to the OLT, receiving a first message sent by the OLT, where the first message is used to query the first vendor information; and sending, according to the first message, a second message including the first vendor information to the OLT.

In some embodiments of the disclosure, the first vendor information is vendor information preset in a memory of the ONU before delivery, or the first vendor information is vendor information that is sent by an OLT and that is of a vendor to which the OLT belongs. When determining that the first vendor information is null, an OLT sends vendor information of a vendor to which the OLT belongs to the ONU.

It may be understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the disclosure. The storage medium includes any medium that can store program code, such as a Universal Serial Bus (USB) flash drive, a removable hard disk, a read-only memory (ROM), a random access memory (RAM), a magnetic disk, or an optical disc.

The foregoing embodiments are merely intended for describing the technical solutions of the disclosure, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the disclosure.

What is claimed is:

1. A method for authenticating an optical network unit (ONU) in a passive optical network system, comprising:
   obtaining, by an optical line terminal (OLT), first vendor information of the ONU when the ONU goes online, wherein the first vendor information is first information of a first vendor to which the ONU belongs;
   comparing, by the OLT, the first vendor information with second vendor information, wherein the second vendor information is second information of a second vendor to which the OLT belongs;
   determining, by the OLT, that authentication on the ONU fails when a comparison result indicates that the OLT and the ONU belong to different vendors; and
   after determining that the authentication on the ONU fails, sending, by the OLT, a third message to the ONU, wherein the third message indicates that the authentication on the first vendor information fails, and wherein the third message is configured to bind the ONU to a second OLT to the first vendor to which the ONU belongs.

2. The method for authenticating the ONU according to claim 1, wherein obtaining, by the OLT, the first vendor information of the ONU comprises:
   sending, by the OLT, a first message to the ONU, wherein the first message is used to query the first vendor information; and
   receiving, by the OLT, a second message from the ONU in response to the first message, wherein the second message comprises the first vendor information.

3. The method for authenticating the ONU according to claim 1, wherein the method further comprises:
   determining, by the OLT, that the authentication on the ONU succeeds when the comparison result indicates that the OLT and the ONU belong to a same vendor, wherein determining that the authentication of the ONU succeeds further comprises determining that identification information of the ONU is authentic, and wherein the identification information of the ONU is separate from the first vendor information of the ONU; and
   sending, by the OLT, a fourth message to the ONU, wherein the fourth message indicates that the authentication on the first vendor information succeeds.

4. A method for authenticating an optical network unit (ONU) in a passive optical network system, comprising:
   sending, by the ONU, first vendor information to an optical line terminal (OLT) when the ONU goes online, wherein the first vendor information identifies a first vendor to which the ONU belongs, and wherein the first vendor information is separate from identification information of the ONU; and
   receiving, by the ONU, a first message from the OLT based on the first vendor information, wherein the first message indicates that authentication on the first vendor information fails, wherein the first message is received based on failed authentication on the ONU according to the first vendor information and second vendor information, wherein the failed authentication on the ONU indicates that the OLT and the ONU belong to different vendors, and wherein the second vendor information is vendor information of a second vendor to which the OLT belongs, wherein before sending, by the ONU, the first vendor information to the OLT, the method further comprises receiving, by the ONU, a third message from the OLT, and wherein the third message is configured to bind the ONU to a second OLT of the first vendor to which the ONU belongs.

5. The method for authenticating the ONU according to claim 4, wherein after sending, by the ONU, the first vendor information to the OLT, the method further comprises receiving, by the ONU, a second message from the OLT based on the first vendor information, wherein the second message indicates that the authentication on the first vendor information succeeds, wherein the second message is received based on successful authentication on the ONU, and wherein the successful authentication on the ONU indicates that the OLT and the ONU belong to a same vendor.

6. The method for authenticating the ONU according to claim 4, wherein after receiving, by the ONU, the first message from the OLT based on the first vendor information, the method further comprises actively going offline by the ONU.

7. The method for authenticating the ONU according to claim 4, wherein before sending, by the ONU, the first vendor information to the OLT, the method further comprises receiving, by the ONU, the third message from the OLT, wherein sending, by the ONU, the first vendor information to the OLT comprises sending, by the ONU according to the first message, a fourth message comprising the first vendor information to the OLT.

8. An optical line terminal (OLT) in a passive optical network system, comprising:
a processor; and
a receiver coupled to the processor and configured to obtain first vendor information of an optical network unit (ONU) when the ONU goes online, wherein the first vendor information identifies a first vendor to which the ONU belongs,
wherein the processor is configured to:
compare the first vendor information with second vendor information, wherein the second vendor information identifies a second vendor to which the OLT belongs; and
determine that authentication on the ONU fails when a comparison result indicates that the OLT and the ONU belong to different vendors,
wherein the OLT further comprises a transmitter coupled to the processor and configured to send a third message to the ONU after determining that the authentication on the ONU fails, wherein the third message indicates that the authentication on the first vendor information fails, and wherein the third message is configured to bind the ONU to a second OLT of the first vendor to which the ONU belongs.

9. The OLT according to claim 8, wherein the receiver is further configured to send a first message to the ONU, wherein the first message relates to a query on the first vendor information, wherein the receiver is configured to receive a second message from the ONU based on the first message, and wherein the second message comprises the first vendor information.

10. The OLT according to claim 8, wherein the processor is further configured to determine that the authentication on the ONU succeeds when the comparison result indicates that the OLT and the ONU belong to a same vendor, wherein the transmitter is further configured to send a fourth message to the ONU after determining that the authentication on the ONU succeeds, and wherein the fourth message indicates that the authentication on the first vendor information succeeds.

11. An optical network unit (ONU) in a passive optical network system, comprising:
a processor;
a transmitter coupled to the processor and configured to send first vendor information to an optical line terminal (OLT) when the ONU goes online, wherein the first vendor information is vendor information of a first vendor to which the ONU belongs; and
a receiver coupled to the processor and configured to receive a first message from the OLT according to the first vendor information, wherein the first message indicates that authentication on the first vendor information fails, wherein the first message is received based on failed authentication on the ONU according to the first vendor information and a second vendor information, wherein the failed authentication on the ONU indicates that the OLT and the ONU belong to different vendors, and wherein the second vendor information is vendor information of a second vendor to which the OLT belongs,
wherein the receiver is further configured to receive a third message from the OLT, and wherein the third message is configured to bind the ONU to a second OLT of the first vendor to which the ONU belongs.

12. The ONU according to claim 11, wherein the receiver is further configured to receive a second message from the OLT according to the first vendor information after sending the first vendor information to the OLT, wherein the second message indicates that the authentication on the first vendor information succeeds, wherein the second message is received after the authentication on the ONU succeeds, and wherein the authentication on the ONU succeeds indicates that the OLT and the ONU belong to a same vendor.

13. The ONU according to claim 11, wherein the processor is further configured to perform a procedure of actively going offline after receiving the first message from the OLT according to the first vendor information.

14. The ONU according to claim 11, wherein the transmitter is further configured to send, according to the first message, a fourth message comprising the first vendor information to the OLT.

15. The method for authenticating the ONU according to claim 1, wherein the first vendor information uniquely identifies the first vendor to which the ONU belongs, and wherein the second vendor information is locally stored on the OLT.

16. The method for authenticating the ONU according to claim 1, further comprising:
authenticating, by the OLT, identification information of the ONU;
determining, by the OLT, that the authentication on the ONU succeeds when (1) the identification information of the ONU is consistent with local configuration data stored on the OLT and (2) the comparison result indicates that the OLT and the ONU belong to a same vendor; and
allowing the ONU to migrate to the OLT of the same vendor after determining that the authentication on the ONU succeeds.

17. The method for authenticating the ONU according to claim 1, further comprising:
   determining, by the OLT, whether identification information of the ONU is authentic after determining that the first vendor information is null;
   determining, by the OLT, that the authentication on the ONU succeeds after determining that the identification information of the ONU is authentic; and
   authorizing, by the OLT, the ONU to be used with the OLT of the second vendor after determining that the authentication on the ONU succeeds.

* * * * *